May 28, 1946. O. LANGFELDER 2,401,002
MACHINE FOR WORKING WOOD AND THE LIKE
Filed Oct. 14, 1943 2 Sheets-Sheet 2
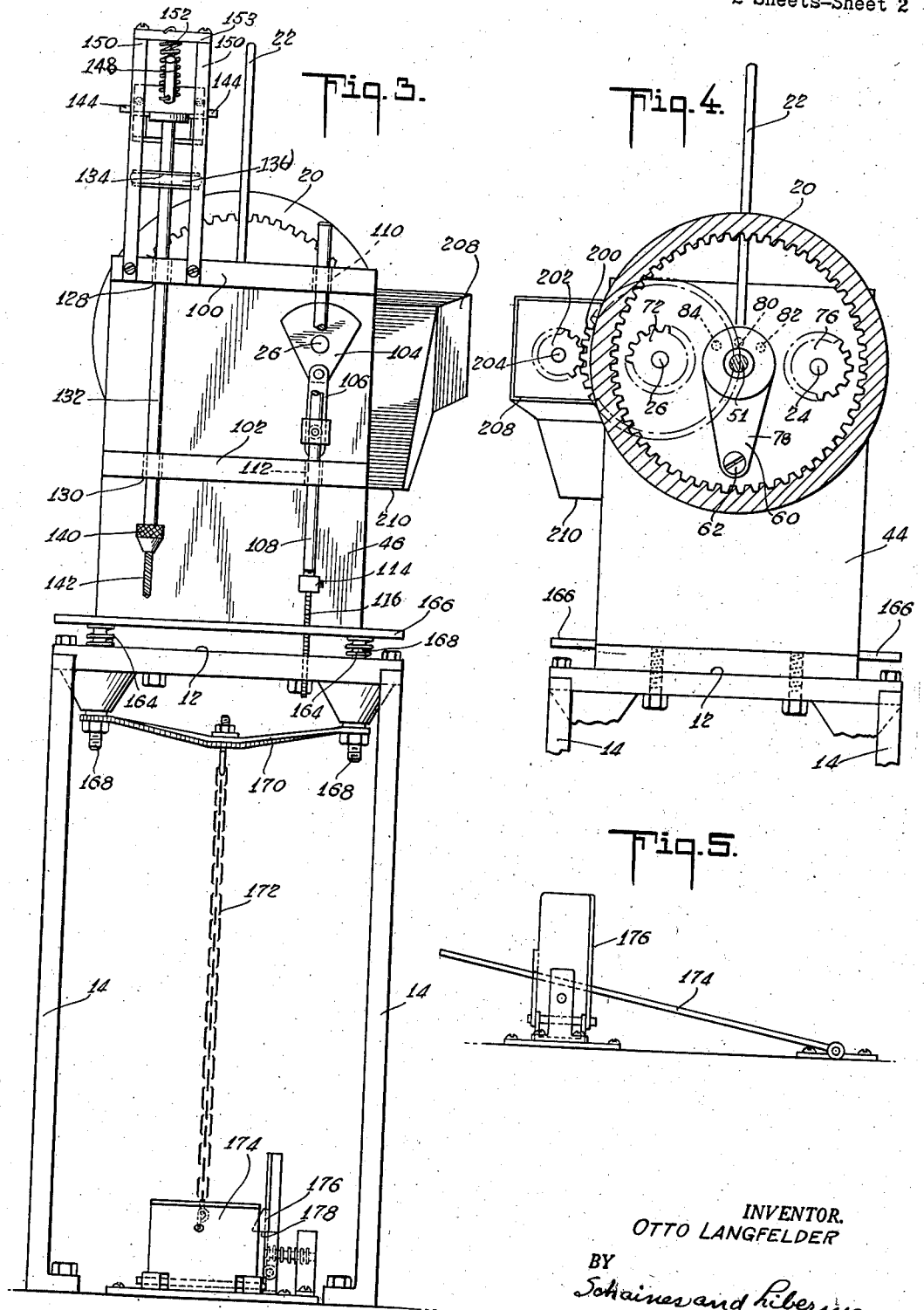
INVENTOR.
OTTO LANGFELDER
BY
Schaines and Liberman
ATTORNEYS Patented May 28, 1946

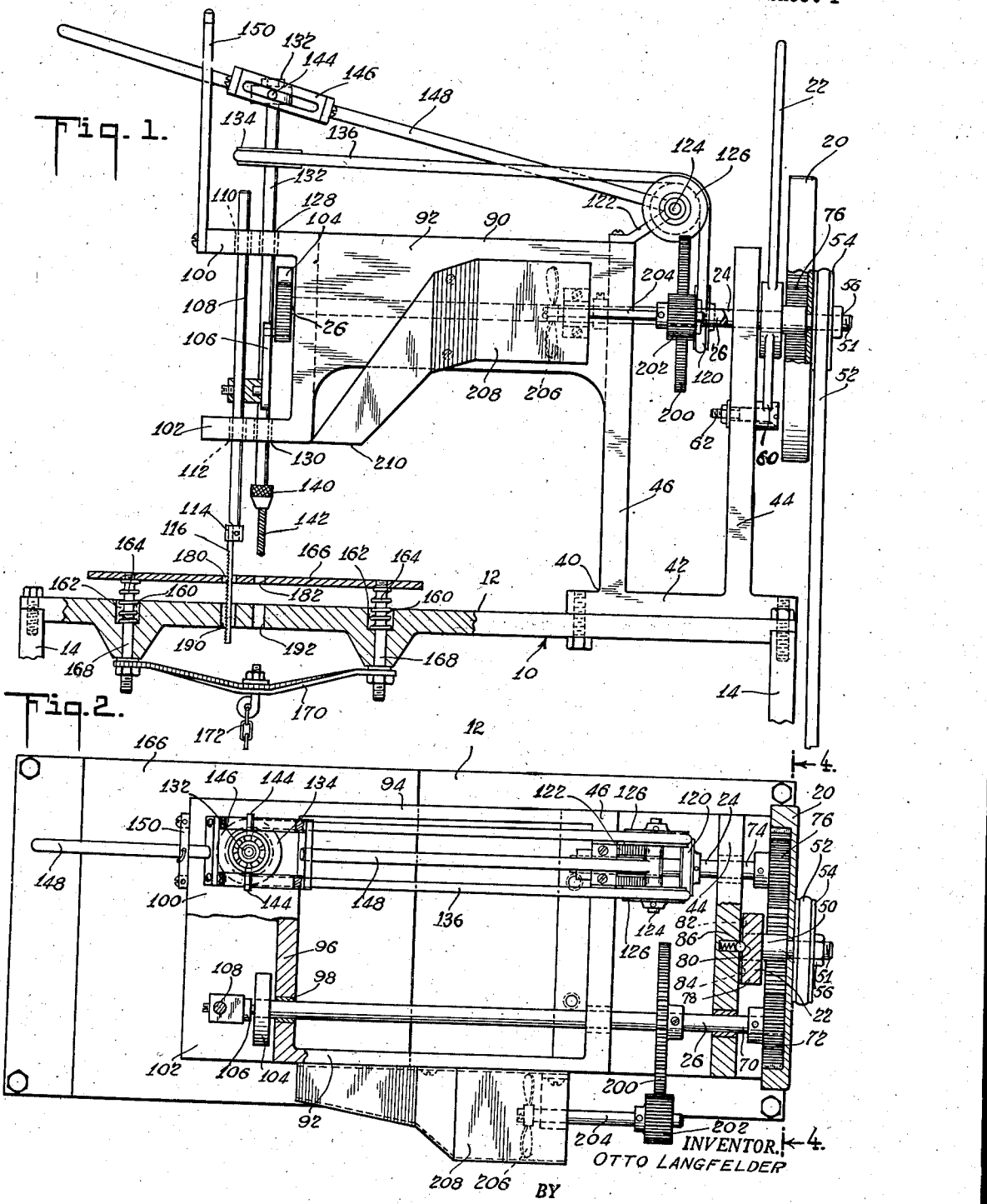

2,401,002

UNITED STATES PATENT OFFICE 2,401,002

MACHINE FOR WORKING WOOD AND THE LIKE

Otto Langfelder, New York, N. Y.

Application October 14, 1943, Serial No. 506,290

1 Claim. (Cl. 143—132)

My invention relates to a machine for sawing or otherwise forming interior designs through pieces of wood, plywood, fiber boards, plaster boards, plastic material, or the like. Such devices are generally known as scroll-sawing or jig-sawing machines.

In forming these designs, an outline thereof is first superposed on the material to be worked, a pilot opening made through the material, and the saw blade passed therethrough. Scroll- or jig-sawing machines are well known, but in almost every instance they employ either a continuous band-saw or a saw secured at both ends thereof. Such saws must first, of course, be freed at one end from the holding mechanism. The free end of the saw is then threaded through the pilot opening, and it must be resecured before the actual sawing or cutting can be commenced. These operations (loosening, threading and resecuring) take time and reduce the amount of work which can be produced by the operator.

The main object of my invention, therefore, is the provision of a combined hole boring and design cutting machine, in which the saw need not be disconnected in order to pass it through the pilot opening; in which a single source of power rotates the hole boring mechanism and reciprocates the saw; in which a novel clutching mechanism is provided whereby the borer or cutter may be selectively engaged and disengaged simply and easily, and in which the work table is provided with a top surface which may be vertically reciprocated as desired during the boring and sawing operations.

Other and further objects of my invention will be pointed out specifically hereinbelow, and still others will be apparent from the following description of an illustrative embodiment.

In the drawings annexed hereto and forming a part hereof,

Figure 1 is a side view, partly in elevation and partly in section, of one form of machine constructed according to and embodying my invention;

Fig. 2 is a top plan view thereof, also partly in section;

Fig. 3 is an end elevational view, as seen from the left side of Fig. 1;

Fig. 4 is an end elevational view, as seen from the right side of Fig. 1; and

Fig. 5 is a side elevational view of the pedal and pedal-catch arrangement, seen in end elevation in Fig. 3.

I provide a frame 10 which comprises a flat top portion 12 and a number of legs 14, supporting the top in spaced relation to the floor. Legs 14 are preferably bolted or otherwise firmly secured to the floor to prevent or reduce vibration. Atop frame 10, I mount my operating mechanisms, comprising an internal master ring gear 20, a clutch mechanism 22, and drive shafts 24, 26, for the borer and saw respectively.

I provide a supporting housing 40, formed as by casting or otherwise, comprising a bed portion 42, which is clamped or bolted atop table 12, and having a pair of vertically upstanding spaced-apart standards 44, 46. Master gear 20 is mounted on a rocker arm adjacent standard 44 and shafts 24, 26 project through standard 44, and are journalled in suitable recesses in upright 46.

The main shaft 50 is fixed at one end thereof to rocker arm 22, and master ring gear 20 is rotatably mounted thereon, adapted to be rotated on shaft 50 along with belt-52 driven wheel 54, the other end 51 of shaft 50 projecting beyond wheel 54, and supporting a lock nut 56 which prevents wheels 54, 20 from sliding off shaft 50. The lower end 60 of rocker arm 22 is apertured, and is locked onto upright 44 by means of a suitable bolt 62 passing through the aperture in the rocker arm and a registering aperture in upright 44. Clutch arm 22 may be rocked back and forth, about bolt 62, carrying with it the master gear 20.

At its outer end 70, shaft 26 has fixed thereon a gear 72 extending into the recess of internal ring gear 20. At its outer end 74, shaft 24 has fixed thereon a gear 76, also extending into the recess of internal ring gear 20. When rocker arm 22 is in neutral position, as shown in Fig. 4, the master drive gear 20 is disengaged from both driven gears 74, 76, but when rocker arm 22 is thrown forward (as viewed in Figs. 1 and 2) gear 20 will be brought into meshing and driving engagement with gear 72, causing same to rotate and rotating shaft 26 along therewith. When rocker arm 22 is pulled back, the master drive gear 20 will be disengaged from gear 72 and brought into meshing and driving engagement with gear 76, causing same to rotate and rotating shaft 24 along therewith.

The lower portion of rocker arm 22 is widened, as indicated at 78, and has formed therein three notches or recesses 80, 82, 84. A suitable spring pressed ball or other detent 86 is provided and is mounted within standard 44, ball 86 being received within the recesses 80, 82, 84 to releasably hold the rocker arm (and gear 20) in any desired position; in neutral position, in recess 80;

in shaft-24 engaging position in recess 82; and in shaft-26 engaging position in recess 84.

An arm 90 is provided, integral with and extending outwardly from standard 46. Arm 90 is formed as by casting or otherwise, and comprises front wall 92, rear wall 94, and a side wall 96. Shaft 26 extends through standard 46 and through a registering aperture 98 in side wall 96. A pair of vertically spaced-apart, horizontally extending bracket arms 100, 102 are formed on arm 90, and shaft 26 extends through standard 46 and through a registering aperture 98 in side wall 96, and into the space between brackets 100, 102. A crank wheel 104 is fastened onto the terminal end of shaft 26, for rotation therewith, pivotally connected to the upper end of a pitman 106, the lower end of which is suitably linked to a vertically reciprocating shaft 108, which projects through vertically aligned apertures 110 and 112 in brackets 100, 102 respectively. Thus, as shaft 26 rotates crank wheel 104, shaft 108 is caused to reciprocate vertically. A socket 114 is fastened onto the lower end of shaft 108, and a saw blade 116, of any desired length, may be secured in socket 114. Blade 116 is secured at only one end, and is preferably formed of such material and of such thickness as to operate when secured at only the upper end thereof, and its length, in respect of the table top 12 may be regulated, as desired.

Shaft 24 has secured thereon, for rotation therewith, an annularly grooved wheel 120. Atop upright 46, I mount an angularly extending arm 122 and journal a shaft 124 therein. A pair of annularly grooved idler rollers 126, 126 are secured onto the ends of shaft 124. As seen in Figs. 1 and 2, rollers 126, 126 are mounted at right angles to wheel 120. A pair of vertically aligned openings 128, 130 are formed through brackets 100, 102, respectively, and a shaft 132 threaded therethrough. An annularly grooved roller 134 is fixed on shaft 132, level with the tops of rollers 126, 126. A continuous belt or pulley 136 is passed about wheel 120, over rollers 126, 126 and around roller 134, and as shaft 24 is rotated, the horizontal line rotation thereof will be translated into vertical line rotation of shaft 132.

A drill socket 140 is secured at the lower end of shaft 132, into which suitably sized and shaped bits, as 142 may be secured. The upper end of shaft 132 is provided with outwardly projecting cross pins 144, 144 which are received within a cross-head frame 146 attached to an elongated arm 148. The rear end of arm 148 may be pivoted on shaft 124, and the front end may be passed through between a pair of upright guide bars 150, 150 mounted atop bracket 100. A coil spring 152 may be secured at its lower end to arm 148 and at its upper end to the cross bar 153 connecting guides 150, 150, so that downward movement of arm 148 will be resisted by the tensioning of spring 152. The normal tensioning of spring 152 is such, and the positioning of parts is such, that, as seen in Figs. 1 and 3, the bottom of shaft 132 will normally be raised above the top of the work table surface.

The operating portion of table 12 is, of course, below the hole borer shaft 132 and saw shaft 108, and suitable apertures 190, 192 are formed through table 12 in line with shafts 108, 132, respectively (see Fig. 1). A number of other apertures 160, 160 are formed through table 12, spaced about apertures 190, 192 and inwardly of the edges of the table. These apertures are enlarged near the top of the table, defining recesses 162, 162, and a coil spring 164 is disposed within each recess 162, 162.

A flat sheet or platform 166 is provided, of area substantially equal to the area of the table top, and a number of bolts 168 are secured to the underside thereof, extending through coil springs 164 and through opening 160, 160 beyond the underside of the table. A cross-arm or spider 170 is secured to the projecting ends of bolts 168, and a chain 172 is provided, the upper end of which is secured to spider 170, and the lower end of which is secured to a foot board or pedal 174. A catch 176 is located adjacent pedal 174, to lock same as desired when it is depressed below the level of finger 178. As seen in Fig. 3, when pedal 174 is depressed, it draws platform 166 down to lie flatly against table top 12. Openings 180, 182 are formed through platform 166 aligned with openings 190, 192 respectively. Catch 176 may be shifted away from pedal 174 to permit same to be raised by the expansion of coil springs 164, 164.

I may mount a spur gear 200 on shaft 26 between uprights 44, 46 and mesh with it a gear 202 secured to a shaft 204 which has a fan blade 206 thereon, projecting into a housing 208 the mouth 210 of which is directed towards openings 180, 182, 190, 192, so that as sawdust and shavings are created by the boring and sawings, same will be blown away, keeping the work clean and permitting the operator to observe the progress of the work at all stages thereof.

In operation, the piece of wood or other material to be worked is laid flatly atop platform 166. Pedal 174 is depressed and locked in the depressed position by catch 176, chain 172 carrying platform 166 down with it until it is lying flatly against the top of table 12. Rocker arm 22 is then grasped by the operator and pulled forward meshing master ring gear 20 with gear 72, causing rotation of shaft 24 which will be translated into rotation of shaft 132. Arm 148 is then pulled downwardly and the hole cut through the board by bit 142. When the hole has been bored through the material being treated, the downward pressure on arm 148 is relaxed, permitting the arm to be drawn upwardly by the contraction of spring 152. Catch 176 is then disengaged from pedal 174, and platform 166 permitted to rise carrying the work with it. The material being treated is thereupon shifted on platform 166 so as to bring the hole just bored therethrough into line with saw blade 116. Rocker arm 22 is thrown forwardly and locked via ball 86 fitting into recess 84, and gear 76 engaged causing rotation of shaft 26 which is translated into vertical reciprocating movement of the saw blade 116. The board being worked is thereupon shifted in accordance with the design to be desired, and fan 206 will blow the sawdust away so that the operator can observe the progress of the sawing.

It will be seen that I have provided in my master ring gear arrangement a device whereby both the boring and sawing mechanisms are actuated from a single source of power (the motor for rotating belt or pulley 52 is not shown).

With my device, the saw blade need never be disengaged except if broken or for replacement purposes. The provision of the vertically shiftable platform provides a resilient working surface and the scroll sawing or jig sawing with my mechanism may be carried on much more efficiently and economically than in past constructions.

Having now described my invention, what I claim and desire to secure by Letters Patent is:

In a device of the character described, a flat-topped work table, a plurality of socketed recesses in the upper side thereof, a spring in each recess, a flat platform disposed above said table in parallel relation thereto resting on and supported by said springs, the normal biasing of the springs urging the platform upwardly of and away from the table, and means to shift the platform downwardly against the normal biasing of the springs to bring same towards and flatly against the table top, said platform having a plurality of elongated bolts projecting downwardly through the socketed recesses in the table, said bolts being secured to a spider, the shifting means acting on the spider to bring the platform down against the table top against the normal biasing of the springs, and means to releaseably lock the platform in position flatly against the table top.

OTTO LANGFELDER.